Sept. 14, 1965    G. G. GOURIET ETAL    3,206,672
APPARATUS FOR DETERMINING THE TRANSFER FUNCTION OF THE FOUR
TERMINAL LINEAR ELECTRICAL SYSTEM
Filed Jan. 9, 1961    4 Sheets-Sheet 2

INVENTOR
GEOFFREY GEORGE GOURIET ETAL
By Mawhinney & Mawhinney
ATTYS

United States Patent Office 3,206,672
Patented Sept. 14, 1965

3,206,672
APPARATUS FOR DETERMINING THE TRANSFER FUNCTION OF THE FOUR TERMINAL LINEAR ELECTRICAL SYSTEM
Geoffrey George Gouriet and Rodney Walter Levinge, Chessington, England, assignors to The Wayne Kerr Laboratories Limited, Chessington, England, a British company
Filed Jan. 9, 1961, Ser. No. 81,618
Claims priority, application Great Britain, Jan. 11, 1960, 903/60
16 Claims. (Cl. 324—57)

This invention relates to apparatus for determining the transfer function of an electrical system. The electrical system may be any system having an electrical signal as an input and an electrical signal as an output and might be an electrical network or apparatus or might be any other system, e.g. a mechanical or chemical or acoustical system, with suitable transducers to have an electrical signal input and an electrical signal output.

In general, the differential equation of a four terminal system may be written:

$$\alpha_0 R + \alpha_1 \frac{dR}{dt} \ldots \alpha_n \frac{d^n R}{dt^n} = \beta_0 E + \beta_1 \frac{dE}{dt} \ldots \beta_m \frac{d^m E}{dt^m}$$

where $R(t)$ is the response function with respect to time of the system to an arbitrary excitation $E(t)$ and where all the coefficients $\alpha_0, \alpha_1 \ldots \beta_0, \beta_1$ are real constants. The transfer function of such a system may be defined as:

$$F(p) = \frac{R(p)}{E(p)} = \frac{\beta_0 + \beta_1 p + \beta_2 p^2 \ldots \beta_m p^m}{\alpha_0 + \alpha_1 p + \alpha_2 p^2 \ldots \alpha_n p^n} \quad (1)$$

where $E(p)$ and $R(p)$ are the complex Fourier transforms of $E(t)$ and $R(t)$ respectively. A knowledge of $F(p)$ is sufficient to determine completely the linear behaviour of the system in all circumstances, using well known operational methods.

Heretofore the type of apparatus known as a transfer function analyser has merely determined the phase and amplitude of the output of the system under test in response to a given input. From the data provided by such apparatus, after making a number of measurements, the abovementioned coefficients $\alpha_0, \alpha_1 \ldots$ and $\beta_0, \beta_1 \ldots$ may be calculated but the calculation may be a lengthy mathematical operation. It is one of the objects of the present invention to provide an apparatus enabling these coefficients to be determined directly.

According to this invention, apparatus for determining the transfer function of an electrical system comprises a phase and amplitude comparator having first and second inputs, and means for feeding an electrical signal having a changing amplitude and at least the first derivative thereof to each of the two inputs, one of the feeding means being adapted to include the system under test. The changing electrical signal most conveniently is a periodic signal and would generally be a sinusoidal signal. If a sinusoidal signal is differentiated, the first derivative and also each further derivative is of sinusoidal form. For convenience in the following description reference will be made to a sinusoidal signal and to its derivatives and the expression "sinusoidal signal" is used to distinguish the basic signal from its derivatives.

For some purposes however it may be preferred to use a non-sinusoidal signal; for example a signal having a step function waveform or having a waveform, e.g., a rectangular pulse waveform or a ramp waveform, formed by integrating a step function one or more times.

In one arrangement of the invention, apparatus for determining the transfer function of a four terminal linear electrical system comprises a phase and amplitude comparator having first and second inputs, and means for feeding to each of the two inputs thereof a sinusoidal signal of adjustable frequency and at least the first derivative thereof in adjustable proportions, one of the feeding means being adapted to include the system under test.

The invention also includes within its scope apparatus comprising a variable frequency oscillator arranged to provide a sinusoidal ouptut and at least the first derivative thereof, a phase and amplitude comparator, means for feeding to one input of the comparator a first combined signal from said oscillator consisting of the sinusoidal output and the derivative or derivatives thereof in adjustable proportions, means for feeding to the system under test a second combined signal from said oscillator consisting of the sinusoidal output and the derivative or derivatives in adjustable proportions and means for feeding the output of the system under test to the second input of the comparator.

The signal fed directly to the comparator may be adjusted to have the sinusoidal signal and the derivatives in the proportions $\beta_0, \beta_1, \beta_2 \ldots$ etc. The signal fed to the system under test may be adjusted to have the sinusoidal signal and the derivatives in the proportions $\alpha_0, \alpha_1, \alpha_2 \ldots$ etc. If this latter signal is then fed to the system under test having the transfer function given in Equation 1 above, the output of the system under test is equivalent to that of a sinusoidally excited system with a transfer function $$F^1(p) = \frac{\beta_0 + \beta_1 p + \ldots \beta_m p^m}{\alpha_0 + \alpha_1 p + \ldots \alpha_n p^n} \cdot (\alpha_0 + \alpha_1 p + \ldots \alpha_n p^n) \quad (2)$$

This output is thus identical in phase and amplitude with the signal fed directly to the comparator. Since, in general, a system under test has one unique set of coefficients $\alpha$ and $\beta$, provided the comparator shows equality of phase and amplitude, the proportions of the sinusoidal signals and the derivatives give the required values of these coefficients.

In practice, it has been found that, for most purposes it will generally be satisfactory to determine the cofficients $\alpha$ for the values of $n$ up to a maximum of 6 and $\beta$ for values of $m$ up to a maximum of 4. Assuming these figures, it will be necessary to feed the sinusoidal signal and the first four derivatives thereof in adjustable proportions to one input of the comparator and the sinusoidal signal and the first six derivatives thereof in adjustable proportions to the system under test whence they are fed ultimately to the second input of the comparator. The sinusoidal signal and the derivatives may be obtained by using an oscillator giving a sinusoidal output together with a series of differentiating circuits, the first differentiating circuit differentiating the output of the oscillator and each successive one differentiating the output of the preceding one to give the required derivatives. The differentiating circuits may conveniently each comprise a high gain amplifier with a capacitive input and resistive feedback. In such an arrangement the differentiating circuits all preferably have the same time constant of differentiation so that the magnitudes of the various derivatives may be determined directly by the settings of similar potentiometers connected across the various successive outputs, the potentiometers being adjustably tapped to provide the required adjustable proportions. Two such potentiometers, would be provided for each differentiating network to provide the two separate outputs for feeding to the comparator directly and to the system under test. Such an instrument may be employed by firstly setting the oscillator to the minimum frequency and then adjusting the relative magnitudes of the sinusoidal outputs fed direct to the comparator and fed to the system under test to give as near as possible equal phase and amplitude of the outputs. The proportions of the first derivatives are then adjusted to correct as far as possible for any residual lack of equality. The frequency is then increased and the proportions of the first derivatives may then be re-adjusted. Further adjustments are made of the proportions of the various successive derivatives with further increases of frequency. It will be appreciated that the cefficients $\alpha_0$ and $\beta_0$ could be accurately determined by the adjustment of the proportions of the sinusoidal signals if the frequency were zero. The coefficients $\alpha_1$ and $\beta_1$ could be determined accurately if the frequency were such as to give effectively a straight line waveform. Similarly a square law waveform would theoretically be desirable for adjusting the second derivatives to determine $\alpha_2$ and $\beta_2$. In practice the required adjustments may readily be made starting with an extremely low frequency, for example a sinusoidal signal having a period of many seconds or possibly even minutes. Using such a low frequency it is preferable to employ as a phase and amplitude comparator an oscilloscope having a cathode ray tube with afterglow. The signals to be compared are applied to the X and Y deflector means of the oscilloscope so that, if these signals are of equal amplitude and phase, a straight line at 45° to the deflection directions of the two orthogonal deflector means would be produced.

Although in referring to two sets of differentiators above, mentioned has been made of feeding one set of combined differentiated signals to the system under test, ti would be possible, although generally not so convenient, to feed a sinusoidal signal to the system under test and to effect differentiation of the output of the system under test.

Instead of using an oscillator with a series of successive differentiating circuits, it is preferred to use an oscillator comprising a number of integrators connected in series and having a feedback loop with feedback from the output of each integrator to the input of one of the integrators, the feedback being of such amplitude as to maintain the circuit in oscillation. With such an oscillator, the various derivatives may readily be obtained from the outputs of the various successive stages. For the apparatus described above for determining transfer function of a linear network, it is particularly convenient to use an oscillator comprising four integrators connected in series. The outputs of the successive integrators will by 90° different in phase at a frequency determined by the time constants of integration and, using four similar integrators the outputs of the second and the fourth may be fed back to the input in appropriate amplitudes to maintain oscillation whilst the outputs of the first and third integrators may be fed back in appropriate proportions to maintain zero phase quadrature component at the input. It will be seen that the outputs of the various stages may be used as the required sinusoidal signal and also the first four derivatives thereof. It is found that such an oscillator may readily be constructed to give a frequency which is adjustable over a very wide range providing signals of frequencies extending from very low frequencies having a period of many seconds or even minutes up to frequencies of many kilocycles per second, for example 50 kilocycles per second.

If such an oscillator is used to provide a number of successive derivative signals, it may be required to have further derivatives, for example, for the input to the system under test and, for this purpose, a differentiating circuit or differentiating circuits may be provided. For example, the oscillator might provide the first four derivatives and it might be required to have the fifth and sixth derivatives in the input to the system under test; for this purpose the fourth derivative signal may be fed to two differentiating circuits in series. Preferably, however, the further differentiating circuit or circuits are arranged to operate on the combined output signal from the integrators, the outputs from the differentiating circuit or from each differentiating circuit being added to a known fraction of the combined signal from the integrators as the settings of the various adjustments then provided the coefficients of a factorised expression which, assuming four integrators and two differentiating circuits, will be a quartic multiplied by a quadratic.

For reasons which will be apparent later, it is most convenient to have integrators all with the same time constant of integration and, if differentiating circuits are also employed, to have the same time constant for both integrating and differentiating circuits.

The following is a description of a number of embodiments of the invention, reference being made to the accompanying drawings in which.

Figure 1:
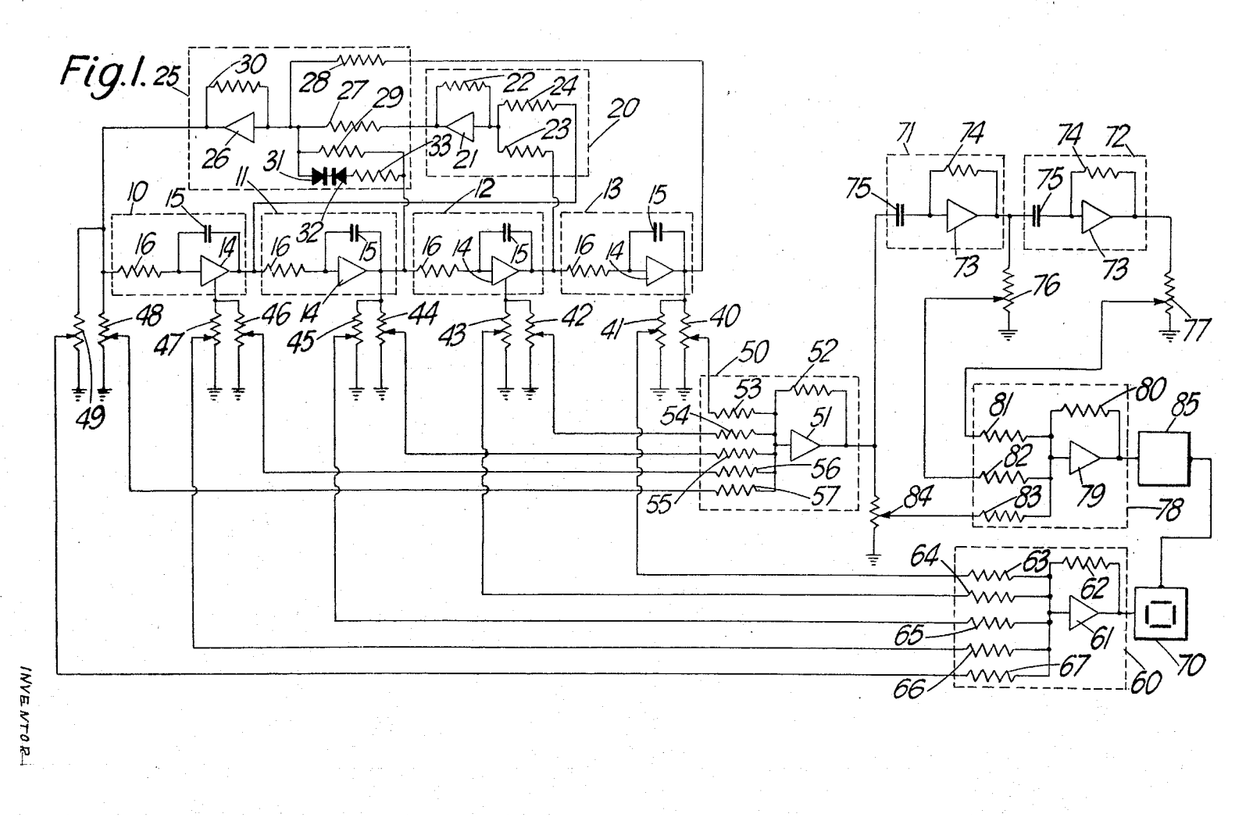
FIGURE 1 is a circuit diagram illustrating one form of apparatus for measuring the transfer function of a four-terminal linear electrical system.

The oscillatory shown in FIGURE 1 of the accompanying drawings comprises four integrators 10, 11, 12, 13 connected in series, each integrator consisting of a high gain amplifier 14 with a feedback capacitor 15 and an input resistor 16. The feedback capacitors 15 and the input resistors 16 of all the integrators are made to equal magnitudes so as to give identical time constants of integration. The outputs from the first and third integrators 10 and 12 are combined in an adding unit 20 consisting of a high gain amplifier 21 having a feedback resistor 22 and two separator input resistors 23, 24 so that the proportions of the two signals added together depend on the magnitudes of resistors 23 and 24. The magnitude of the combined output of the adding unit 20 depends on the magnitudes of all three resistors 22, 23 and 24. This combined feedback signal is then fed to a second adding unit 25 comprising a high gain amplifier 26 with an input resistor 27 through which the signals from the adding unit 20 are fed to be combined with feedback signals from the fourth integrator 13 applied through an input resistor 28 and from the second integrator 11 applied through an input resistor 29. The second adding amplifier 25 has a feedback resistor 30 and the combined output is applied to the input of the integrator 10. To obtain stable oscillation there must be unity power gain around the loop and the outputs from the second and fourth integrators have to be combined in appropriate proportions to achieve this. Since it would not be possible to obtain exactly unity gain in practice, the components are arranged to give slightly more than unity gain and a limiting circuit consisting of two Zener diodes 31, 32 in series with a resistor 33 is connected in shunt across the resistor 29 so that the circuit will have a predetermined amplitude of oscillation at the output from the second integrator. The frequency of oscillation of the circuit is adjustable by switching the capacitors 15 in the feedback circuits of the integrators but, for simplicity of drawing, this switching means is not shown in FIGURE 1 of the accompanying drawings. Such switching, it will be noted, will alter the time constant of integration. Fine adjustment of the frequency may be effected by adjustment of the resistors 22, 23, 24, 27, 28 and 30 in the feedback circuits. When used in the transfer function determining apparatus, for any one system under test, the time constant of integration is kept constant and only the fine adjustment is employed using the resistors which may typically give a frequency range with a ratio of ten to one between the maximum and minimum frequencies. The resistor 29 is maintained constant as the magnitude of the feedback impedance in the path from the output of the second integrator 11 determines whether the oscillations at this point increase or decrease in amplitude. If this feedback impedance is large the oscillations will increase in amplitude and conversely, if it is small the oscillations will decrease. The resistor 29 is made of such value that the oscillations would tend to increase but the amplitude is limited by Zener diodes 31, 32 connected, in series with a resistor 33, across the resistor 29. The system thus has a stable amplitude of oscillation at the output of the second integrator.

Although the voltage output of the second integrator is maintained constant, the outputs of the other integrators will be at levels dependent on the frequency and preferably at the mid-frequency of the range the outputs of all the integrators are made equal. In a typical case the amplitude at the input and at the output may vary between ten times and $\frac{1}{10}$ of the amplitude of the second integrator. With this frequency range, and assuming the integrators have equal amplitudes at the mid-frequency, then at the highest frequency the output of the fourth integrator will be ten times that of the second whilst the input to the first integrator will be one tenth the output of the second integrator. At the highest frequency, the situation is reversed, the input to the first integrator having an amplitude ten times the output of the second integrator. The sinusoidal output (i.e. the basic undifferentiated signal for the transfer function determining apparatus) is taken from two potentiometers 40, 41 fed from the output of the fourth integrator 13. The first derivative signals are taken from two potentiometers 42, 43 fed from the integrator 12 and, in this case, polarity reversal will be necessary to give the required polarities of the outputs. The second derivatives are taken from potentiometers 44, 45 connected to the output of the second integrator 11 whilst the third derivatives are taken from potentiometers 46, 47 fed from the first integrator 10 with reversal. The fourth derivatives are taken from potentiometers 48, 49 fed by the input to the first integrator 10. It will be seen that this oscillator provides a sinusoidal signal and the first, second, third and fourth derivatives thereof in adjustable proportions on two separate potentiometers for each component. One set of signals are combined in an adding unit 50 comprising a high gain amplifier 51 with a feed back resistor 52 and five input resistors 53–57 connected respectively to the taps on the potentiometers 41, 43, 45, 47 and 49. The other set of signals from the oscillator are combined in the adding unit 60 consisting of a high gain amplifier 61 with a feedback resistor 62 and five input resistors 63–67 connected respectively to the taps on the potentiometers 40, 42, 44, 46 and 48. The output from the adding unit 60 is applied to the X plates of an oscilloscope indicated diagrammatically at 70. The output from the adding unit 50 is fed to two differentiating circuits 71, 72 each consisting of a high gain amplifier 73 with a feedback resistor 74 and input capacitor 75. These differentiating circuits are arranged to have the same time constant as the integrating circuits 10, 11, 12 and 13 and, for this reason, the capacitors 75 are switched when the oscillator frequency is altered by switching the capacitors 15. The outputs from the two differentiating circuits 71, 72 are adjustably tapped by potentiometers 76, 77 respectively and then combined in an adding unit 78 consisting of a high gain amplifier 79 with a feedback resistor 80 and input resistors 81, 82 and 83 with an adjustably tapped portion of the output of the adding unit 50 which is applied to a potentiometer 84. The output from the unit 78 is applied to the system under test which is indicated diagrammatically at 85 and resultant output therefrom is applied to the Y plates of the oscilloscope 70.

The output from the adding units 50 and 60 may be represented by operation on a sinusoidal input of the transfer functions $Fa(p)$ and $Fb(p)$ respectively where $$Fa(p) = a_0 + a_1pT + a_2p^2T^2 + a_3p^3T^3 + a_4p^4T^4 \quad (3)$$

and $$Fb(p) = b_0 + b_1pT + b_2p^2T^2 + b_3p^3T^3 + b_4p^4T^4 \quad (4)$$

where $a_0, a_1 \ldots$ and $b_0, b_1 \ldots$ etc. are constants determined by the settings of potentiometers 40, 42, 44 $\ldots$ and 41, 43, 45 $\ldots$ etc. respectively.

The effect of the potentiometer 84, the differentiating circuits 71, 72 and the adding unit 78 may be expressed as a transfer function $Fc(p)$, where $$Fc(p) = c_0 + c_1pT + c_2p^2T^2 \quad (5)$$

The values $c_0$, $c_1$ and $c_2$ are determined by the settings of potentiometers 84, 76 and 77 respectively.

The input to the system under test is $Fa(p) \times Fc(p)$. It will be seen that, assuming the apparatus has been adjusted to give inputs of equal phase and amplitude to the oscilloscope 70, the $\beta$ coefficients in Equation 1 are determined from the settings of potentiometers 41, 43, 45, 47, 49 whilst the $\alpha$ coefficients are determined from the settings of potentiometers 40, 42, 4, 46, 48 and of potentiometers 84, 76 and 77. In this way the denominator of Equation 1 is factorized into quartic and quadratic expressions. There will be three alternative settings and, if two such settings are found, the coefficients of the quadratic expression in the second setting will determine one of the quadratic factors of the quartic in the first expression. Thus the denominator of Equation 1 may be, by use of the apparatus described, factorized into three quadratic expressions enabling the roots to be obtained. Obviously, if so desired, the numerator of expression (1) could be factorized into quadratic expressions by using differentiating circuits operating on the combined signal from the unit 60 before it is fed to the oscilloscope.

Figure 2:
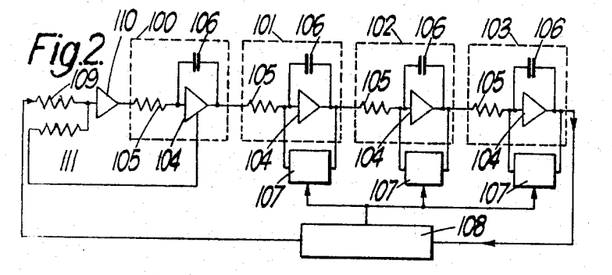
FIGURE 2 is a block diagram illustrating another oscillator.

For some purposes, it may be preferred to use a nonsinusoidal input signal since such a signal inherently contains components of different frequencies so that the use of such a signal may obviate the need for changing the oscillator frequency during the course of a test. FIGURE 2 illustrates a suitable form of oscillator for this purpose. The oscillator of FIGURE 2 comprises four integrators 100–103 connected in series, each integrator comprising a high gain amplifier 104 with an input resistor 105 and a feedback capacitor 106. Across the capacitors 106 in each of the last three integrators 101 to 103 is a clamp 107, for example a double diode circuit, which, by the application of a control potential, can discharge the capacitors 106 of these integrators. The output of the last integrator 103 is fed to a comparator 108 comprising a mono-stable multivibrator which is triggered from its normal state as soon as the amplitude of the output from the integrator 103 exceeds a predetermined datum value which is such that the integrator does not saturate. The mono-stable multivibrator will re-set itself to its normal state after a short delay. The output of the comparator is thus a rectangular pulse, as shown at (f) in FIGURE 3. This pulse is applied as the control signal to the clamps 107 and is made of sufficient duration to enable the capacitors 106 to discharge fully. The output of the comparator is also fed through a first input resistor 109 of a high gain amplifier 110. This amplifier has a second input resistor 111 into which is fed an inverted output from the integrator 100. By inverting the output from the integrator 100, the amplifier 110 forms, in effect a subtracting circuit which subtractively combines the output from the comparator 108 with the output from the integrator 100.

Figure 3:
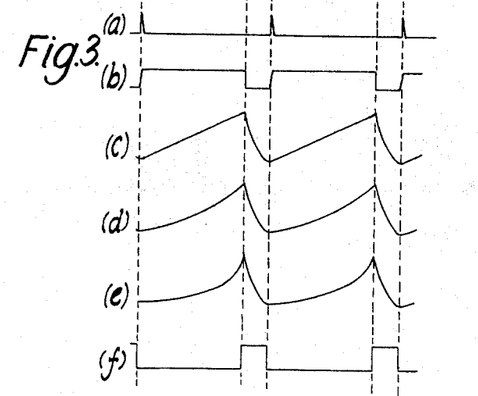
FIGURES 3 and 4 are waveform diagrams.
Figure 4:
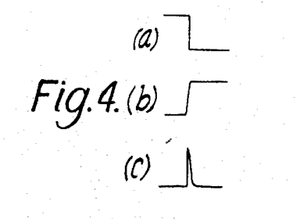

The operation of the circuit of FIGURE 2 may conveniently be explained by assuming a short duration pulse input to the integrator 100 as shown at line (a) in FIGURE 3. Such an impulse would be integrated by the integrator 100 to produce the step function output shown in line (b). This is fed to the integrator 101 to produce the ramp function output in line (c) and thence to the integrator 102 to produce the time squared function shown in line (d). In the particular circuit shown in FIGURE 2, there are four integrators and the output of the fourth integrator is a time cubed function shown at (e). In general, if there are $n$ integrators in the chain, the output $v$ of the $n^{th}$ integrator will be a function $v = Vt^{(n-1)}$ where V is a constant and $t$ is time. The last integrator of the chain (assuming all the integrators are similar) will be the first to approach a saturation amplitude and hence the comparator 108 is responsive to the output of that integrator and, before saturation is reached will be triggered. This comparator produces the output waveform shown at (f) in FIGURE 3 and sets the clamp circuits 107 to discharge the capacitors 106 of the integrators. It is not necessary to have a clamp on the first integrator 100 since the comparator output waveform is applied via the amplifier 110 to the input of the integrator 100 and hence will bring the output of the integrator 100 down to zero. The output from the comparator 108 when it is re-set to its normal state will be a clearly defined step function as is shown at (a) in FIGURE 4 which shows this part of the waveform to a greatly enlarged time scale compared with FIGURE 3. Due to the time constant of integration, the corresponding output of the integrator 100 will be of the form shown at (b) in FIGURE 4 and hence the difference signal produced by the high gain amplifier 110 will be the required short duration impulse as shown at (c) in FIGURE 4.

Depending on the output waveform required, the impulse from the amplifier 110 might be fed into the integrator 100 as in FIGURE 2 of the drawings or direct into integrator 101 or integrator 102. In applying the invention to the transfer function computer the outputs from all the integrators 100 to 103 may be used simultaneously.

If the required waveform is a ramp function, instead of using clamps, when the comparator operates upon rise of the output level, the polarity of pulse may be reversed so that the output function then runs down giving a symmetrical waveform.

It will be seen that, by the use of suitable switched means, the oscillator shown in FIGURE 1 of the accompanying drawings may readily be converted into the oscillator shown in FIGURE 2. The amplifier 26 of the sinusoidal oscillator may be used as the high gain amplifier 110 of FIGURE 2 whilst the integrators 10 and 13 may be used as the integrators 100 to 103.

Figure 5:
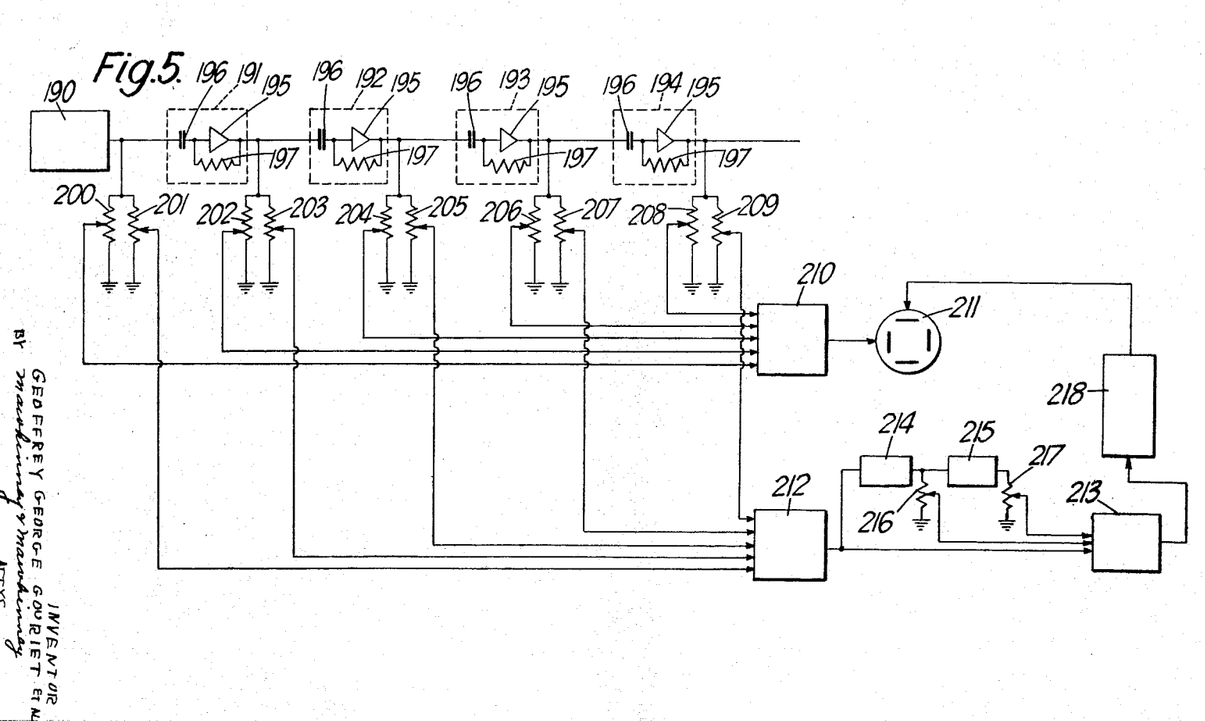
FIGURE 5 is a block diagram illustrating another form of apparatus for measuring the transfer function of a four-terminal linear electrical system.

FIGURE 5 of the drawings illustrates another embodiment of the invention. Referring to this figure there is shown an oscillator 190, which may be of any convenient form of construction to provide a sinusoidal output, which output is fed to four differentiating circuits 191 to 194 arranged in series so as to give respectively outputs representing the first, second, third and fourth derivatives of the oscillator output signal. Each differentiating circuit comprises a high gain amplifier 195 with a capacitive input 196 and a resistive feedback 197. All the differentiating circuits are arranged to have the same time constant of differentiation. Across the output of the oscillator 190 are provided two adjustably tapped potentiometers 200, 201 which provide signals in adjustable proportions of the oscillator output. Similar pairs of potentiometers 202, 203 and 204, 205 and 206, 207 and 208, 209 across the outputs of the differentiating circuits provide signals of adjustable amplitude representative of the first, second, third and fourth derivatives. The outputs from the potentiometers 200, 202, 204, 206 and 208 are fed into a first adding amplifier 210 to provide a combined signal which is used as one input of a comparator 211. This comparator may conveniently be a cathode ray tube oscilloscope similar to the oscilloscope 70 previously described. Signals from the potentiometers 201, 203, 205, 207 and 209 are fed to a second adding amplifier 212 to provide a combined signal which is fed not only to a third adding amplifier 213 but also to two further differentiating circuits 214 and 215 arranged in series. Adjustable proportions of the outputs from the differentiating circuits 214, 215 from output potentiometers 216, 217 respectively are also fed into the adding amplifier 213 which provides a combined output signal to be fed to the system under test 218. The resultant output from the system under test forms the second input for the comparator 211.

It will be seen that the system shown in FIGURE 5 provides a sinusoidal signal with the first four derivatives in adjustable proportions which are fed to one input of the comparator. A similar sinusoidal signal together with the first four derivatives in adjustable proportions are fed to an adding amplifier 212 and thence through the adding amplifier 213 to form an input to the system under test. The additional differentiating circuits 214, 215 enable the system under test to be fed with signals up to the sixth derivative but the settings of the potentiometers 201, 203, 205, 207, 209, 216 and 217 represent the coefficients of quartic and quadratic expressions forming factors of the denominator of Equation 1. The arrangement illustrated in FIGURE 1 thus enables the expression to be factorized and the coefficients may be obtained directly from scale readings of the potentiometer settings. This is generally more convenient than using two further differentiating circuits to differentiate the output from the differentiating circuit 195 and then to add the signals from the oscillator and all the differentiating circuits together in a single adding amplifier as the potentiometer settings would then represent the coefficients of a sixth power expression forming the denominator of Equation 1.

Although in the system illustrated in FIGURE 5, a combined signal representative of the original sinusoidal signal and the first six derivatives is fed to the system under test, it would alternatively be possible to feed merely the sinusoidal signal to the system under test and to differentiate the output using a series of differentiating stages, the outputs of which are added together in adjustable proportions to obtain the required second input to the comparator 211.

Figures 6, 7, 8:
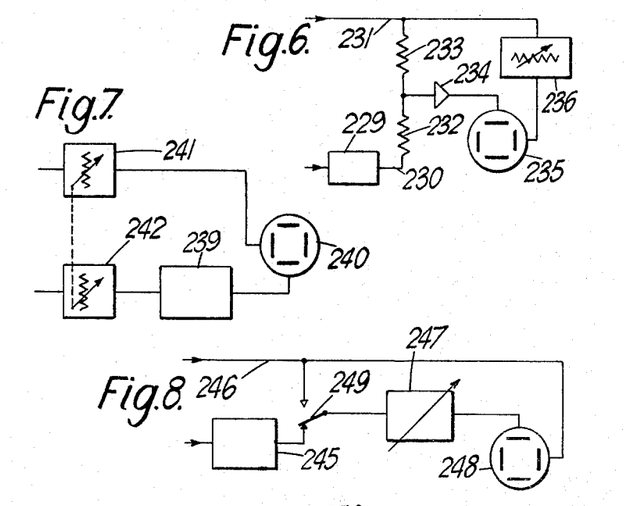
FIGURES 6 to 10 illustrate modifications of the arrangements shown in FIGURE 1 or FIGURE 5.

FIGURE 6 illustrates a modified form of comparator which may be used in the apparatus of the drawing accompanying the provisional specification or of FIGURE 5. In order to obtain a more accurate measurement of the phase and amplitude equality of the signals to be compared, the output from the system under test which is indicated at 229 and the comparison signal from units 60 or 210 are subtractively combined, the two signals for this purpose being applied respectively by leads 230, 231 to the two ends of a potentiometer formed by resistors 232, 233. The difference signal at the junction of resistors 232, 233 is amplified by an amplifier 234 and then fed to the Y axis deflector means of a cathode ray oscilloscope 235. The comparison signal from lead 231 is fed through an adjustable attenuator 236 to the X axis deflector means of the oscilloscope 235. With the arrangement of FIGURE 6, when phase and amplitude equality is reached, there will be no deflection in the Y direction and this can very readily be determined by adjusting the attenuator 236 to give no X deflection so that a spot is obtained on reaching equality. The provision of the X deflection is to facilitate the adjusting of the controls of the proportions of the derivatives to reach equality as the shape of the trace produced will be generally indicative of the adjustment required. For example, if a ramp function input is used for testing and the oscilloscope shows a horizontal line with the ends curved, then the higher order derivatives have to be adjusted whereas if the trace was a straight line at an angle to the X axis, the lower order terms require adjustment. The type of comparator shown in FIGURE 6 avoids the necessity for having to adjust a trace on the oscilloscope screen to be at exactly 45°. This adjustment to an angle of 45° is not critical if the transfer function only has denominator terms but may have to be done accurately if there are numerator terms; the errors in such adjustment are greatly reduced by using the comparator of FIGURE 6 since it is then only necessary to adjust the controls to bring the trace to a spot which can readily be done to a high degree of accuracy.

As shown in FIGURE 7, which illustrates a modification of the arrangement of FIGURE 1 or FIGURE 5 the level of the input signal to the unit under test (indicated diagrammatically at 239) and the level of the comparison signal (from unit 60 or 210) fed to the comparator 240 may be adjusted simultaneously by ganged attenuators, for example potentiometers 241, 242, so that the two signals fed to the comparator are equally attenuated. Since the signals are equally attenuated, the settings of the attenuators 241, 242 will not affect the measurement of the transfer function but will control the amplitude of the signal fed to the system under test 239. The arrangement of FIGURE 7 may be used for example if the system under test will saturate above a certain signal level or if the system under test is non-linear, that is to say if its response depends on the amplitude of the input signal. If the system under test is non-linear, by using the attenuators 241, 242 the signal level input to the system can be controlled as desired so that the transfer function can be determined at any required signal level.

The system under test may generate noise or may include some noise source and, in order to reduce the effects of noise, a filter or filters may be employed in the comparison means. FIGURE 8 illustrates one such arrangement which may be employed in the apparatus of FIGURE 1 or FIGURE 5 and in which the system under test is indicated at 245. The comparison signal to be compared with the output of the system under test is fed to the comparator by a lead 246. A tunable band pass filter 247 is included in the circuit between the system under test 245 and the oscilloscope comparator 248 and a switch 249 is provided so that the input from lead 246 may be fed to the comparator both directly to the X deflector means and through the filter 247 to the Y deflector means. This arrangement is used with an oscillator giving a single frequency of sinusoidal form so that the measurements are effected at any one time using only signals of one frequency. The filter 247 is tuned to the source frequency by connecting the switch 249 to the position such that the input lead 246 is connected both directly and through the filter to the comparator, the filter then being tuned by means of the indication on the oscilloscope 240 to give no phase shift at the source frequency. The switch 249 is then put in the position to connect the output from the system under test 245 to the comparator 248 and the test can then proceed as before. At each frequency employed the filter will have to be retuned. Provided the filter 247 is a narrow-band filter it will substantially cut out all the noise and will pass only the required sine wave signal. Conveniently the filter 247 is formed with a low-pass section and a high-pass section each having a sharp cut-off and having their pass-bands overlapping. The low-pass section may comprise a chain of cathode followers with an adjustable resistor between the output (i.e. the cathode) from each cathode follower stage, and the input grid of the next stage and an adjustable feedback capacitor from the output of each stage to the input of the preceding stage. Similarly the high-pass filter may be made of a chain of cathode followers with an adjustable capacitor between the output of each stage and the input of the next stage and an adjustable feedback resistor between the output of each stage to the input of the preceding stage. Such low-pass and high-pass filters using chains of cathode followers in this manner give very sharp cut-offs and, by tuning the filters so that the pass bands just overlap, a very narrow pass band filter is obtained with unity gain and zero phase shift.

Figure 9:
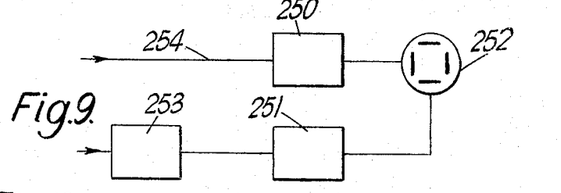

As shown in FIGURE 9, instead of using a band pass filter 247 as in FIGURE 8, two low-pass filters 250, 251 may be used in the two inputs to a comparator 252 from the system under test 253 and from the comparison signal source represented by a lead 254. Such low-pass filters 250 will not affect the comparison even if they should introduce phase shifts or amplitude changes, these will have identical effects in the two channels and will therefore cancel out. Such filters 250, 251 therefore do not need tuning and thereby simplify the operation, although the use solely of low-pass filters will give a smaller reduction of noise than the arrangement of FIGURE 8.

Figure 10:
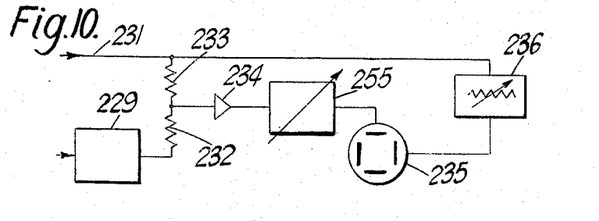

FIGURE 10 illustrates a modification of the arrangement of FIGURE 6 and the same reference numerals are used to indicate corresponding components. In the arrangement of FIGURE 10 a tunable band-pass filter 255 is introduced between the amplifier 234 and the comparator 235, that is to say in the difference detecting circuit. Here again the tuning of the filter is not critical since the phase errors operate on the difference signal and hence effectively operate identically on the two signals to be compared. The filter 255 again serves to reduce the noise from any noise source in the system under test 229.

We claim:

1. Apparatus for determining the transfer function of an electrical system comprising a phase and amplitude comparator having first and second inputs, and means for feeding an electrical signal having a changing amplitude and at least the first derivative thereof in adjustable proportions to said first input and said system under test and means for feeding the output of the system under test to the other input of the comparator.

2. Apparatus for determining the transfer function of a linear electrical system having an input and an output which apparatus comprises a phase and amplitude comparator for determining when two electrical input signals to the comparator have the same phase and are equal in amplitude, a signal source providing a periodic electrical signal and at least its first derivative, means for feeding said periodic electrical signal and its derivative or derivatives in adjustable proportions to the input of the system under test, means for feeding the periodic electrical signal and its derivative or derivatives in adjustable proportions to one input of the comparator and means for feeding the output from the system under test to the other input of the comparator.

3. Apparatus as claimed in claim 2 wherein said comparator is an oscilloscope having a cathode ray tube with afterglow, the signals to be compared being applied to orthogonal deflector means of the cathode ray tube, and wherein low pass filters are included in the two feeds to the orthogonal deflector means.

4. Apparatus as claimed in claim 2 wherein said comparator comprises combining means for combining the two signals to be compared to obtain a difference signal and an oscilloscope for indicating the magnitude of said difference signal.

5. Apparatus as claimed in claim 4 and arranged to operate with a sinusoidal signal source wherein a tunable band pass filter is provided in the feed for the difference signal to the oscilloscope.

6. Apparatus for determining the transfer function of a four terminal linear electrical system comprising a phase and amplitude comparator having first and second inputs, and means for feeding a sinusoidal signal of adjustable frequency and at least the first derivative thereof in adjustable proportions to said first input, means for feeding a sinusoidal signal of said adjustable frequency and at least the first derivative thereof in adjustable proportions to the system under test, over input of the comparator.

7. Apparatus for determining the transfer function of a linear system giving an electrical output in response to an electrical input, which apparatus comprises a phase and amplitude comparator for determining when two electrical input signals to the comparator have the same phase and are equal in amplitude, a signal source providing a periodic step function waveform and at least its first derivative, means for feeding said step function waveform and its derivative or derivatives in adjustable proportions as an input signal to the system under test, means for feeding said step function waveform and its derivative or derivatives in adjustable proportions as one input signal to the comparator and means for feeding the output from the system under test as the other input signal to the comparator.

8. Apparatus for determining the transfer function of a linear system giving an electrical output in response to an electrical input, which apparatus comprises a phase and amplitude comparator for determining when two electrical input signals to the comparator have the same phase and are equal in amplitude, a signal source providing a periodic waveform formed by integrating a step function at least once together with at least the first derivative of the integrated step function, means for feeding said integrated step function and its derivative or derivatives in adjustable proportions to the system under test, means for feeding said integrated step function and its derivative or derivatives in adjustable proportions as one input signal to the comparator and means for feeding the output from the system under test as the other input signal to the comparator.

9. Apparatus for determining the transfer function of a linear system giving an electrical output in response to an electrical input, which apparatus comprises a phase and amplitude comparator for determining when two electrical input signals to the comparator have the same phase and are equal in amplitude, a signal source providing a periodic electrical signal, which signal source consists of at least three integrators connected in series with means for applying an inpulse signal to the first of at least two integrators of said series of integrators and a feedback loop including an amplitude comparison device arranged, when the amplitude of the output of the last integrator of said series reached a datum level, to stop and reset the integrators, first and second means for combining the outputs of said integrators in separately adjustable proportions, means for feeding the combined outputs from the first combining means as an input to the system under test, means for feeding the combined outputs from the second combining means to said phase and amplitude comparator as one input thereto and means for feeding the output from the system under test as the second input signal to said phase and amplitude comparator.

10. Apparatus as claimed in claim 9 wherein said comparator is a mono-stable multi-vibrator and wherein said means for applying an impulse signal to the first of two or more integrators in the series comprises a high gain amplifier forming a combining circuit for subtractively combining the output of the multi-vibrator and the output of the first integrator to produce a pulse output which is fed to said first integrator.

11. Apparatus for determining the transfer function of a linear system giving an electrical output in response to an electrical input, which apparatus comprises a signal source consisting of an oscillator giving a sinusoidal output of adjustable frequency with a first series of differentiating circuits with the first differentiating circuit differentiating the output of the oscillator and each successive differentiating circuit differentiating the output of the preceding one to give a series of derivatives, means for feeding the sinusoidal signal as an input signal to the system under test, a further series of differenitating circuits with each successive one after the first differentiating the output of the preceding one, means for feeding the output of the system under test to the first differentiating circuit of said further series, first combining means for combining in adjustable proportions the output of the system under test and the derivatives thereof from said further series of differentiating circuits, second combining means for combining in adjustable proportions the output of the oscillator and the derivatives thereof from said first series of differentiating circuits, and a phase and amplitude comparator for determining when the outputs of said first and second combining means have the same phase and are equal in amplitude.

12. Apparatus for determining the transfer function of a linear system giving an electrical output in response to an electrical input, which apparatus comprises an oscillator including a number of integrators connected in series to provide a sinusoidal signal and its derivatives, first and second combining means for separately combining the sinusoidal signal with its derivatives in adjustable proportions, means for feeding the output from the first combining means as an input signal to the system under test and a phase and amplitude comparator for determining when the output of the system under test and the output of the second combining means have the same phase and are equal in amplitude.

13. Apparatus as claimed in claim 12 wherein at least one differentiating circuit is provided to differentiate the output from said first combining means and wherein further combining means for combining in adjustable proportions the output of the first combining means and the output of said differentiating circuit to provide the input signal to the system under test.

14. Apparatus for determining the transfer function of a linear system giving an electrical output in response to an electrical input, which apparatus comprises a number of integrators connected in series with a feedback loop giving feedback from the output of each integrator to the input of one of the integrators, the feedback being of such amplitude as to maintain the series of integrators in oscillation, first and second combining means for separately combining the input to said one integrator with the outputs of the integrators in adjustable proportions, means for feeding the output from the first combining means as an input signal to the system under test and a phase and amplitude comparator for determining when the output of the system under test and the output of the second combining means have the same phase and are equal in amplitude.

15. Apparatus as claimed in claim 14 wherein at least one differentiating circuit is provided to differentiate the input to the first integrator to provide at least one further derivative signal and wherein said first combining means include means for adding to the combined signal an adjustable proportion of the output of said differentiating circuit.

16. Apparatus for determining the transfer function of a linear electrical system having an input and an output which apparatus comprises a phase and amplitude comparator for determining when two electrical input signals to the comparator have the same phase and are equal in amplitude, a signal source providing a periodic electrical signal and at least its first derivative, means for feeding said periodic electrical signal and its derivative or derivatives in adjustable proportions to the input of the system under test, means for feeding the periodic electrical signal and its derivative or derivatives in adjustable proportions to one input of the comparator and means for feeding the output from the system under test to the other input of the comparator, said comparator being an oscilloscope having a cathode ray tube with afterglow, the signals to be compared being applied to orthogonal deflector means of the cathode ray tube and arranged to operate with a sinusoidal signal source wherein a band pass filter tuned to the frequency of the sinusoidal signal is included in one input to the comparator.

References Cited by the Examiner

UNITED STATES PATENTS

| | | | |
|---|---|---|---|
| 2,881,388 | 4/59 | Behrend | 324—57 |
| 2,909,726 | 10/59 | Kramer | 324—57 |
| 2,924,777 | 2/60 | Lin et al. | 324—57 X |
| 3,005,151 | 10/61 | Ule | 324—57 |
| 3,060,378 | 10/62 | Smith | 324—57 |

FOREIGN PATENTS 722,205  1/55  Great Britain.

OTHER REFERENCES

"Extending Transducer Transient Response by Electronic Compensation for High Speed Physical Measurements," article in The Review of Scientific Instruments, January, 1958, pp. 14–22.

Kessler: "Transient-Response Equalization Through Steady State Methods," Proceedings of the IRE, Waves and Electrons Section, April, 1949, pp. 447–450.

Moritz: "Transient Video Analyzer," Electronics, June, 1946, pp. 130–135.

WALTER L. CARLSON, *Primary Examiner.*